US009509374B2

(12) United States Patent
Kim et al.

(10) Patent No.: US 9,509,374 B2
(45) Date of Patent: Nov. 29, 2016

(54) WIRELESS POWER TRANSMISSION APPARATUS AND TRANSMISSION METHOD THEREOF

(75) Inventors: Jeong Hoon Kim, Seoul (KR); Kwang Du Lee, Suwon-si (KR); Chul Gyun Park, Suwon-si (KR); Jung Ho Yoon, Anyang-si (KR); Eung Ju Kim, Suwon-si (KR); Sang Hoon Hwang, Seoul (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 704 days.

(21) Appl. No.: 13/208,281

(22) Filed: Aug. 11, 2011

(65) Prior Publication Data

US 2012/0038220 A1 Feb. 16, 2012

(30) Foreign Application Priority Data

Aug. 13, 2010 (KR) .................. 10-2010-0078459

(51) Int. Cl.
*H02J 17/00* (2006.01)
*H04B 5/00* (2006.01)
*H02J 7/02* (2016.01)

(52) U.S. Cl.
CPC ............ *H04B 5/0037* (2013.01); *H02J 7/025* (2013.01); *H04B 5/0081* (2013.01)

(58) Field of Classification Search
CPC .................. H04B 5/0037; H04B 5/0081
USPC ............................................. 307/104
See application file for complete search history.

(56) References Cited

U.S. PATENT DOCUMENTS 3,551,777 A * 12/1970 Bingley ........................ 363/26
2004/0100341 A1* 5/2004 Luetzelschwab et al. ...... 333/32

(Continued)

FOREIGN PATENT DOCUMENTS

JP 2010-141977 6/2010
WO 2009/111597 9/2009
WO 2010/085701 7/2010

OTHER PUBLICATIONS

Office Action dated Nov. 25, 2011 for corresponding App. No. 10-2010-0078459.

(Continued)

*Primary Examiner* — Carlos Amaya
*Assistant Examiner* — Joel Barnett
(74) *Attorney, Agent, or Firm* — NSIP Law

(57) ABSTRACT

Disclosed herein are a wireless power transmission apparatus and a transmission method thereof. The wireless power transmission apparatus is configured to include a wireless power transmitter generating a wireless power signal to be wireless transmitted, wirelessly transmitting the generated wireless power signal by a magnetic resonance manner, receiving a reflection wireless power signal to determine whether or not a load apparatus is presented, and supplying power to the load apparatus; and a wireless power receiver connected to the load apparatus and receiving the transmitted wireless power signal by the magnetic resonance manner and supplying it to the connected load apparatus and reflecting the remaining wireless power signal to the wireless power transmitter, whereby a transmission apparatus can recognize a receiving environment and resonance characteristics are improved, without a separate communication device or a system.

20 Claims, 9 Drawing Sheets

(56) References Cited

U.S. PATENT DOCUMENTS

| | | | |
|---|---|---|---|
| 2006/0025088 A1* | 2/2006 | Pietig et al. | 455/121 |
| 2006/0133598 A1* | 6/2006 | Pagnanelli | 379/406.08 |
| 2007/0171681 A1* | 7/2007 | Baarman | 363/16 |
| 2009/0284218 A1* | 11/2009 | Mohammadian et al. | 320/107 |
| 2009/0284369 A1* | 11/2009 | Toncich et al. | 340/539.3 |
| 2009/0302688 A1* | 12/2009 | Boys | 307/104 |
| 2010/0052431 A1* | 3/2010 | Mita | 307/104 |
| 2010/0052811 A1* | 3/2010 | Smith et al. | 333/33 |
| 2010/0187913 A1* | 7/2010 | Smith | H04B 5/0081 307/104 |
| 2011/0070848 A1* | 3/2011 | Ramachandra Reddy | 455/127.2 |

OTHER PUBLICATIONS

Office Action dated Jul. 23, 2014 for Chinese Patent Application No. 201110233892.6 and its English summary provided by Applicant's foreign counsel.

Teck Chuan Beh et al. "Basic Study of Improving Efficiency of Wireless Power Transfer via Magnetic Resonance Coupling Based on Impedance Matching", Industrial Electronics (ISIE), 2010 IEEE International Symposium, Jul. 7, 2010 (pp. 2011-2016).

\* cited by examiner

WIRELESS POWER TRANSMISSION APPARATUS AND TRANSMISSION METHOD THEREOF

CROSS REFERENCE TO RELATED APPLICATION

This application claims the benefit of Korean Patent Application No. 10-2010-0078459, filed on Aug. 13, 2010, entitled "Wireless Power Transmission Apparatus and Transmission Method Thereof" which is hereby incorporated by reference in its entirety into this application.

BACKGROUND OF THE INVENTION

1. Technical Field

The present invention relates to a wireless power transmission apparatus and a transmission method thereof.

2. Description of the Related Art

With the development of a wireless communication technology, Ubiquitous info-tech environment has been being built so that everybody can transmit and receive his/her desired information at anytime regardless of locations. However, most of the information communication devices has been still operated by a battery and is supplied with power through a wired power cord, such that the use of the information communication devices has been limited. Therefore, wireless information network environment cannot completely be free until a problem of a power supply for a terminal is solved.

In order to solve the problem, many technologies to wirelessly transmit power have been developed.

An example of a representative technology may include a microwave receive type technology using microwave, a magnetic induction type technology using magnetic field, and a magnetic resonance technology using energy conversion between magnetic field and electric field, or the like.

In this case, the microwave receive type technology radiates microwave to the air through an antenna, such that power can be transmitted up to a long distance. However, the microwave receive type technology greatly increases radiation loss in the air, such that there is a limitation in efficiency of power transmission. In addition, the magnetic induction type technology, which is a technology using the coupling of magnetic energy due to a primary coil of a transmitting side and a secondary coil of a receiving side, has the high efficiency of power transmission. However, the magnetic induction technology closes the primary coil of the transmitting side and the secondary coil of the receiving side at a short distance on the order of several mm for power transmission. In addition, there are problems in that the efficiency of power transmission is rapidly changed according to the coil alignment of the primary coil of the transmitting side and the secondary coil of the receiving side and the caloric value is increased.

Therefore, the magnetic resonance technology is similar to the magnetic induction type technology but transmits power in the magnetic energy type by concentrating energy in a specific resonance frequency due to a coil type inductor L and a capacitor C.

The magnetic resonance technology can transmit relatively larger power up to several meters but requires a high quality factor.

That is, the magnetic resonance technology has a disadvantage in that the efficiency thereof is rapidly changed according to whether impedance is matched and whether the resonance frequencies between the LC coil of the transmitting side and the LC coil of the receiving side coincide with each other.

In particular, the impedance mismatch according to the change in distance between the transmitting side and the receiving side is a main factor preventing the maximum wireless power transmission in the wireless power transmission.

The magnetic induction technology according to the prior art mounts communication devices (for example, transceiver) in the transmitting side and the receiving side to control the above-mentioned problems through the communication between the transmitting side and the receiving side.

However, when the communication devices (for example, transceiver) is separately mounted, there are problems in that the costs of the wireless power transmission apparatus and reception apparatus are increased and the configuration of the apparatus is complicated.

SUMMARY OF THE INVENTION

The present invention has been made in an effort to provide a wireless power transmission apparatus capable of transmitting wireless power in an optimal wireless power transmission state by automatically recognizing a receiving environment without a separate communication device module for communication of a transmitting side and a receiving side and a transmission method thereof.

In addition, the present invention has been made in an effort to provide a wireless power transmission apparatus capable of performing more accurate and fine impedance matching by controlling real components and imaginary components of impedance according to the change in distance between a transmitting side and a receiving side and a transmission method thereof.

According to a preferred embodiment of the present invention, there is provided a wireless power transmission apparatus, including: a wireless power transmitter receiving power input from the outside and generating a wireless power signal to be wirelessly transmitted, wireless transmitting the generated wireless power signal by a magnetic resonance manner, receiving a reflection wireless power signal to determine whether or not a load apparatus is presented, and if it is determined that the load apparatus is presented, wirelessly transmitting the wireless power signal by using an optimal impedance and a resonance frequency corresponding to the load apparatus in order to supply power to the load apparatus; and a wireless power receiver connected to the load apparatus and receiving the wireless power signal transmitted from the wireless power transmitter by the magnetic resonance manner and supplying it to the connected load apparatus and reflecting the remaining wireless power signal, that is not consumed, to the wireless power transmitter.

According to another preferred embodiment of the present invention, there is provided a wireless power transmitter, including: a frequency oscillator receiving power input from the outside and generating a wireless power signal to be transmitted; a power amplifier amplifying and outputting the wireless power signal generated from the frequency oscillator; a first resonance antenna including a variable capacitor circuit and a variable inductor circuit, transmitting the wireless power signal by the magnetic resonance manner by using the optimal impedance and the resonance frequency set by varying the inductance and capacitance of the variable capacitor circuit and the variable inductor circuit, and receiving and outputting the wireless power signal reflected from the wireless power receiver; an impedance matching device positioned between the power amplifier and the first resonance antenna to provide the impedance matching between the power amplifier and the first resonance antenna; a directional power coupler positioned between the power amplifier and the impedance matching device or between the impedance matching device and the first resonance antenna and having directivity to output the wireless power signal input through a first port from the power amplifier or the impedance matching device to the first resonance antenna through a second port and output the reflection wireless power signal input through the second port from the first resonance antenna through a third port; an output power detector detecting and outputting the output power of the wireless power signal output from the second port of the directional power coupler; a reflection power detector detecting and outputting the reflection power of the reflection wireless power signal output from the third port of the directional power coupler; and a transmitting controller calculating the ratio of the reflection power to the output power, determining whether or not the load apparatus is presented according to the calculated output-reflection power ratio, and controlling the first resonance antenna so as to transmit the wireless power signal by using the optimal impedance and the resonance frequency corresponding to the load apparatus.

According to another preferred embodiment of the present invention, there is provided a wireless power receiver connected to be a load apparatus, including: a second resonance antenna including a variable capacitor circuit and a variable inductor circuit, receiving wireless power signals transmitted from a wireless power transmitter by a magnetic resonance manner by using optimal impedance and resonance frequency searched by varying the inductance and the capacitance of the variable capacitor circuit and the variable inductor circuit and reflecting the remaining wireless power signal to the wireless power transmitter; a rectifier rectifying the wireless power signal received by a second resonance antenna; a power signal converter connected to a load apparatus and converting the wireless power signal rectified by the rectifier into a power signal according to a power supplying manner and supplying the converted power signal to the load apparatus; and a receiving controller performing a control to receive the wireless power signal in the second resonance antenna by the magnetic resonance manner and supply power to the load apparatus and to reflect the remaining wireless power signal to the wireless power transmitter.

According to another preferred embodiment of the present invention, there is provided a wireless power transmission method, including: (A) detecting a reflected wireless power signal by transmitting a wireless power signal to a wireless power receiver by a wireless power transmitter according to a magnetic resonance manner to confirm whether or not a load apparatus is presented; and (B) if it is determined that the load apparatus connected to the wireless power receiver is presented by the wireless power transmitter, searching a resonance frequency and an optimal impedance performing maximum power transmission and transmitting the wireless power signal by using the searched resonance frequency and optimal impedance.

According to another preferred embodiment of the present invention, there is provided a wireless power transmission method, including: (A) transmitting the wireless power signal to the wireless power receiver by a wireless power transmitter according to a magnetic resonance manner; (B) receiving the reflection wireless power signal reflected from the wireless power receiver by the wireless power transmitter to detect power strength and confirming whether or not a load apparatus is presented; and (C) if it is determined that the load apparatus is presented by the wireless power transmitter, searching an optimal impedance and a resonance frequency performing maximum power transmission and transmitting the wireless power signal by using the searched optimal impedance and resonance frequency.

According to another preferred embodiment of the present invention, there is provided a wireless power receiving method, including: (A) supplying wireless power remaining after a wireless power receiver receives and reflects a wireless power signal transmitted from a wireless power transmitter to a load apparatus connected to the wireless power receiver; and (B) when the load apparatus connected to the wireless power receiver is disconnected, stopping receiving the wireless power signal transmitted from the wireless power transmitter.

DESCRIPTION OF THE PREFERRED EMBODIMENTS

Various objects, advantages and features of the invention will become apparent from the following description of embodiments with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

Hereinafter, preferred embodiments of the present invention will be described in detail with reference to the accompanying drawings.

Figure 1:
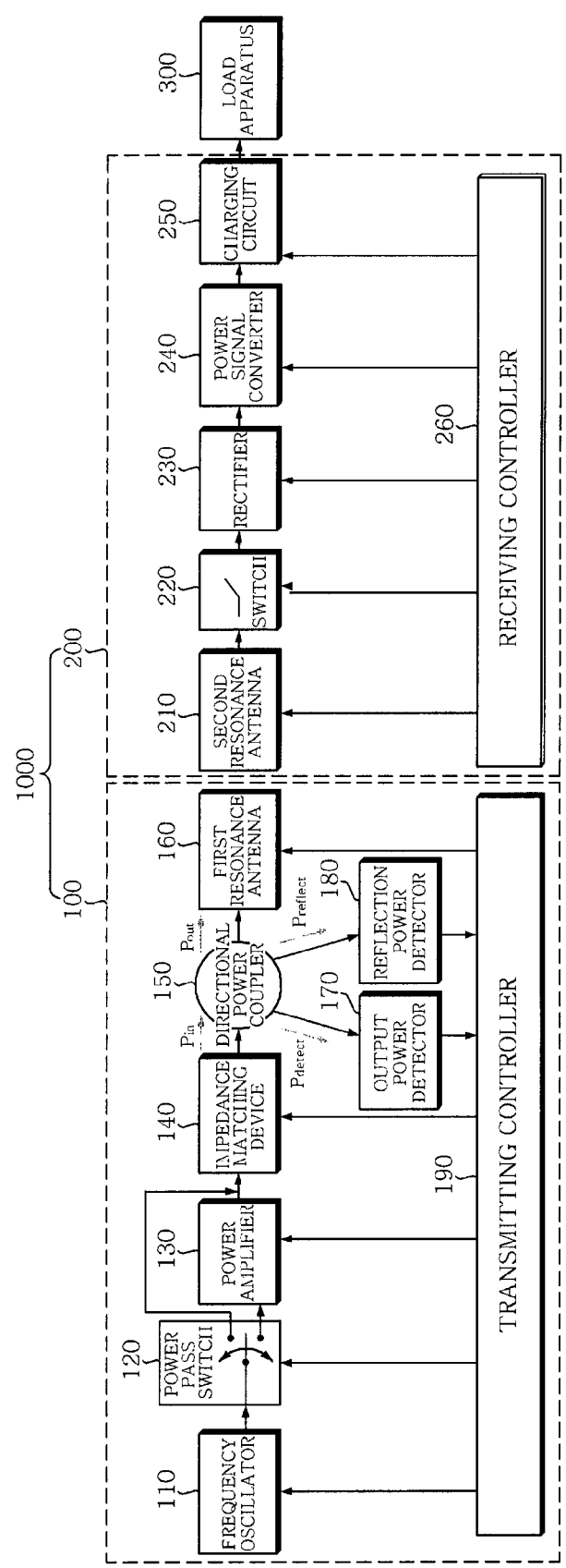
FIG. 1 is a functional block diagram schematically showing a configuration of a wireless power transmission apparatus according to the preferred embodiment of the present invention.

FIG. 1 is a functional block diagram schematically showing a configuration of a wireless power transmission apparatus according to the preferred embodiment of the present invention.

Referring to FIG. 1, a wireless power transmission apparatus 1000 according to a preferred embodiment of the present invention is configured to largely include a wireless power transmitter 100 and a wireless power receiver 200.

The wireless power transmitter 100 is configured to include a frequency oscillator 110, a power pass switch 120, a power amplifier 130, an impedance matching device 140, a directional power coupler 150, a first resonance antenna 160, an output power detector 170, a reflection power detector 180, and a transmitting controller 190.

A wireless power receiver 200 is configured to include a second resonance antenna 210, a switch 220, a rectifier 230, a power signal converter 240, a charging circuit 250, and a receiving controller 260.

The wireless power transmission between the wireless power transmitter 100 and the wireless power receiver 100 is made in a magnetic resonance manner.

That is, the wireless power transmitted from the wireless power transmitter 100 by the magnetic resonance manner is received in the wireless power receiver 200 by the magnetic resonance manner. Such a received wireless power is supplied or stored in a load apparatus 300 connected to the wireless power receiver 200.

Schematically reviewing the wireless power transmission process between the wireless power transmitter 100 and the wireless power receiver 200 by the magnetic resonance manner, the wireless power signals are first generated from the wireless power transmitter 100 to convert the wireless power signal into magnetic energy by LC resonance in a first resonance antenna 160 including a variable inductor and a variable capacitor.

Then, the converted magnetic energy is made by magnetic coupling with a second resonance antenna 210 including the variable inductor and the variable capacitor in the wireless power receiver 200.

In this case, the LC resonance frequency of the first resonance antenna 160 is tuned to the LC resonance frequency of the second resonance antenna 210, thereby making it possible to maximize the coupling of magnetic energy.

That is, since the transmission efficiency is remarkably increased according to the synchronization degree of the resonant frequencies of the first and second resonance antennas 160 and 210, the frequency calibration may be performed to synchronize the resonant frequencies between the first resonance antenna 160 and the second resonance antenna 210.

In addition, in order to increase or control the intensity of the wireless power to be transmitted, the wireless power transmitter 100 uses the power amplifier 130.

In this case, load impedance for driving the power amplifier 130 requires several tens ohms [Ω], while the impedance of the real LC coil of the first resonance antenna 160 is only several ohms [Ω] in order to increase resonance characteristic (Q-factor).

The transmission efficiency is greatly reduced by the impedance mismatch between the power amplifier 130 and the first resonance antenna 160, the calibration for the impedance match is also essential.

Meanwhile, it is defined that the "magnetic field" due to the magnetic coupling always forms a closed loop according to a fourth law of Maxwell's Equations for an electromagnetic wave.

Therefore, electric filed has a far spreading characteristic like a water wave, while the magnetic field has characteristic returned while forming a circle. Therefore, if there is no loss due to a medium, it can be interpreted that energy is always conserved.

Upon using the characteristic, the wireless power transmitter 100 can recognize the environment of the wireless power receiver 200 under the environment (for example, environment in which a transceiver for wireless communication is not presented) in which communication between the wireless power transmitter 100 and the wireless power receiver 200 is not made.

In other words, when the wireless power transmitter 100 is turned-on, if the load apparatus 300 connected to the wireless power receiver 200 is not presented or turned-off (that is, if the wireless power transmitter 100 is not connected to the wireless power receiver 200), the energy loss does not occur when being viewed from the wireless power transmitter 100, such that it may be determined that there is no load apparatus 300 connected to the wireless power receiver 200 under the wireless power transmission environment.

To the contrary, if the load apparatus 300 connected to the wireless power receiver 200 is presented, the energy loss occurs when being viewed from the wireless power transmitter 100, such that it may be determined that the load apparatus 300 connected to the wireless power receiver 200 is presented.

Therefore, the reflection power reflected by the wireless power transmitted from the wireless power transmitter 100 is measured to determine whether the load apparatus 300 connected to the wireless power receiver 200 is presented and if it is determined that the load apparatus 300 connected to the wireless power receiver 200 is presented, the wireless power is transmitted in an optimal state through the resonance frequency control and the impedance control, thereby making it possible to improve the efficiency of the wireless power transmission.

In this case, the load apparatus 300 is a power consuming apparatus by receiving the wireless power transmitted to the wireless power receiver 200 from the wireless power transmitter 100 to charge power in the load apparatus 300 or supply household power.

For example, the load apparatus may be electronic devices/home appliances such as TV, computer, etc., or a battery.

Hereinafter, each component and the operating method of the wireless power transmitter 100 and the wireless power receiver 200 that may be connected to the load apparatus 300 in the wireless power transmission apparatus 1000 of a preferred embodiment of the present invention will be described in more detail.

First, the components and operating method of the wireless power transmitter 100 according to a preferred embodiment of the present invention will be described.

The frequency oscillator 110 converts external power into a wireless power signal. In this case, the wireless power signal is an AC signal. Therefore, since an AC signal input from the outside may have a shape of an AC signal that is not appropriate for the wireless power transmission, the frequency oscillator 110 converts the external power into an AC signal appropriate for wireless transmission and outputs it.

An oscillation frequency of the wireless power signal generated in the frequency oscillator 110 is smaller than the resonance frequency set by a value of a variable inductor and a variable capacitor of the first resonance antenna 160 and is the same as the resonance frequency calculated by being added with a mutual inductance value viewed up to the receiving side from the first resonance antenna 160.

The power amplifier 130 amplifies and outputs the wireless power signal to increase the strength of the wireless power signal or to reach a predetermined strength, thereby increasing the efficiency of the wireless power transmission.

In this case, the power pass switch 120 may be provided between the frequency oscillator 110 and the power amplifier 130.

The power pass switch 120 is require to periodically transmit the wireless power in order to determine whether or not the receiver 200 itself or the load apparatus 300 connected to the receiver 200 is presented. In this case, in order to minimize the waste of power, a path bypassing the power amplifier 130 is provided so that the frequency oscillator 110 is connected to the impedance matching device 140 (or, the directional power coupler 150).

In other words, when the receiver 200 or the load apparatus 300 connected to the receiver 200 is presented, whether or not the receiving side periodically formed is presented may be determined and the unnecessary waste of power may be minimized, by bypassing the wireless power signal generated from the frequency oscillator 110 through the power pass switch 120 rather than performing the amplification.

The impedance matching device 140 is positioned between the power amplifier 130 and the first resonance antenna 160 and provides the impedance matching between the load impedance of the power amplifier 130 and the LC coil of the LC antenna 160 of the first resonance antenna 160 in order to transmit the wireless power signal at the optimal transmission efficiency as described above.

The impedance matching device 140 is configured of a transformer and controls a winding ratio of the transformer to perform the impedance matching.

In particular, the impedance matching using the winding ratio of the transformer may match real components of impedance.

In detail, if it is assumed that impedance viewed to the frequency oscillator 110 from the power amplifier 130 is $Z_1$, a winding number of a primary coil connected to the $Z_1$ is $N_1$, impedance viewed to the receiver from the first resonance antenna 160 is $Z_2$, and a winding number of a secondary coil connected to $Z_2$ is $N_2$, when a winding ration (n) of the transformer configured of the primary coil and the secondary coil depends Equation 1, the impedance $Z_1$ is matched with the impedance $Z_2$.

$$n = N_2/N_1 = \sqrt{Z_2/Z_1} \quad \text{Equation (1)}$$

However, since the impedance $Z_2$ viewed to the receiver from the first resonance antenna 160 may be fluctuated according to the load apparatus 300 connected to the receiving side, the winding ratio n may be varied in order to provide the impedance matching between the power amplifier 130 and the first resonance antenna 160.

Figure 2:
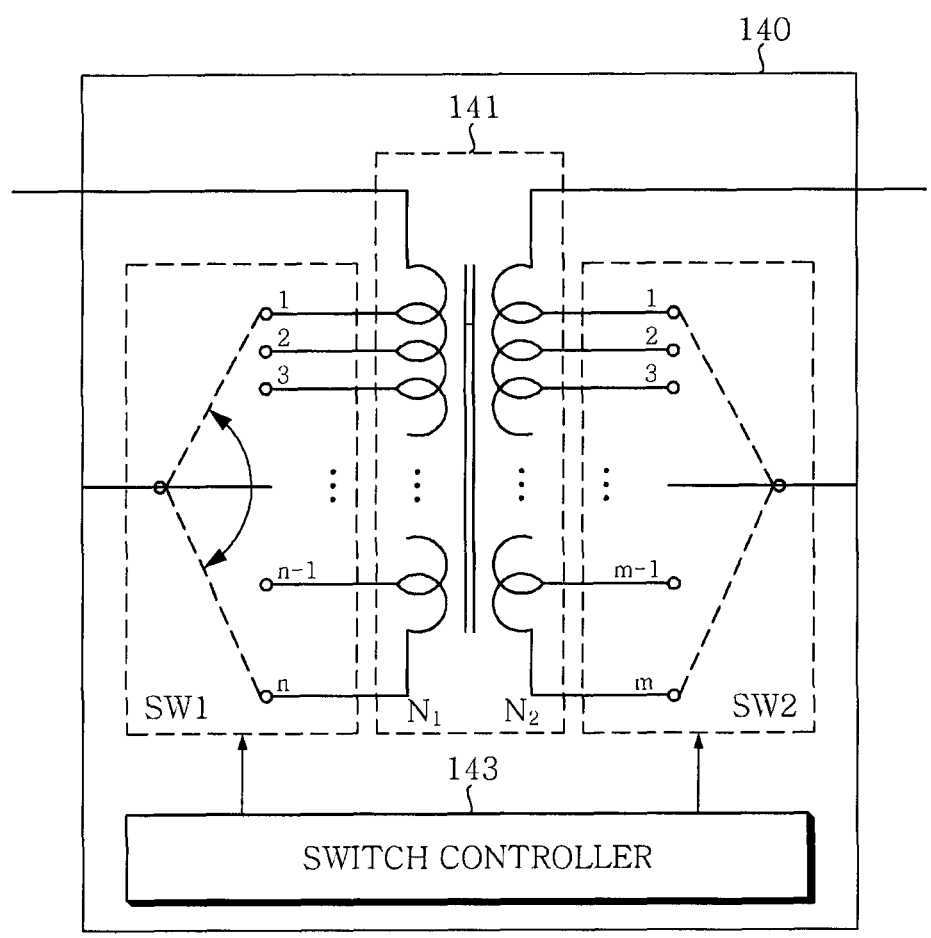
FIG. 2 is a detailed block diagram showing a configuration of an impedance matching device shown in FIG. 1.

Therefore, the transformer used in the impedance matching device 140 may be configured by a variable transformer, wherein an example thereof is shown in FIG. 2.

FIG. 2 is a detailed block diagram showing a configuration of an impedance matching device shown in FIG. 1.

Referring to FIG. 2, the impedance matching device 140 includes a transformation module 141 configured by a primary winding $N_1$ and a secondary winding $N_2$, a plurality of first switches SW1 mounted at the primary winding $N_1$, a plurality of second switches SW2 mounted at the secondary winding $N_2$, and a switch controller 143 connected to the first and second switches SW1 and SW2 and performing a control by turning-on or turning-off the first and second switches SW1 and SW2 to vary the winding ratio n of the primary winding $N_1$ and the secondary winding $N_2$ in order to control the real components of impedance.

The directional power coupler 150 may be mounted between the power amplifier 130 and the impedance matching device 140 or the impedance matching device 140 and the first resonance antenna 160.

The directional power coupler 150 is configured to include a plurality of terminals, wherein a signal input to one terminal is output to only one of the remaining terminals but is not output to the other remaining terminals, thereby converting the direction of the input signal. In this case, the direction of the input signal has predetermined directivity.

The directional power coupler 150 outputs the wireless power signal input therethrough to the first resonance antenna 160 and transmits it and receives the wireless power signal (hereinafter, referred to as 'reflection wireless power signal') reflected from magnetic coupling energy forming a closed loop through the first resonance antenna 160 and outputs it.

For example, the directional power coupler 150 has directivity to output the wireless power signal input through a first port from the power amplifier 130 or the impedance matching device 140 to the first resonance antenna 160 through a second port and to output the reflection wireless power signal input through the second port from the first resonance antenna 160 through a third port.

As described above, it is preferable that the directional power coupler 150 is configured by a circulator having a plurality of terminals.

The circulator includes a plurality of terminals and transfers and transmits the signal in only one direction regardless of whether the signal is input to any terminals.

In this case, the directional power coupler 150 is connected to the power detector for calculating the ratio of the reflection power to the output power in order to efficiently perform the wireless power transmission.

As the detector, the output power detector 170 and the reflection power detector 180 are used.

The output power detector 170 is transmitted to the first resonance antenna 160 through the directional power coupler 150 and measures the output power ($P_{out} = P_{detect}$) of the wireless power signal output (for example, received from the first port of the directional power coupler 150 and output to the second port) to the receiving side.

The reflection power detector 180 detects the reflection power $P_{reflect}$ of the reflection wireless power signal received and output (for example, received from the second port of the directional power coupler 150 and output to a third port) from the first resonance antenna 160 through the directional power coupler 150.

Whether the load apparatus 300 connected to the receiver 200 is presented is determined according to the ratio of the detected output power $P_{out}=P_{detect}$ to the reflection power $P_{reflect}$.

The first resonance antenna 160 is configured to include the variable inductor and the variable capacitor and when the wireless power signal is input, convert the wireless power signal into magnetic energy by the LC resonance due to the variable inductance and capacitance to form a closed loop.

The first resonance antenna 160 controls the resonance frequency due to the LC resonance with the receiving side as well as performs the impedance matching due to the variable LC.

In this case, the above-mentioned impedance matching device 140 performs the matching controlling the real components of impedance, while the first resonance antenna 160 performs the matching controlling the imaginary components of impedance.

The imaginary component of impedance is controlled according to the inductance and capacitance changed by varying the variable inductor and the variable capacitor of the first resonance antenna 160.

Figure 3:
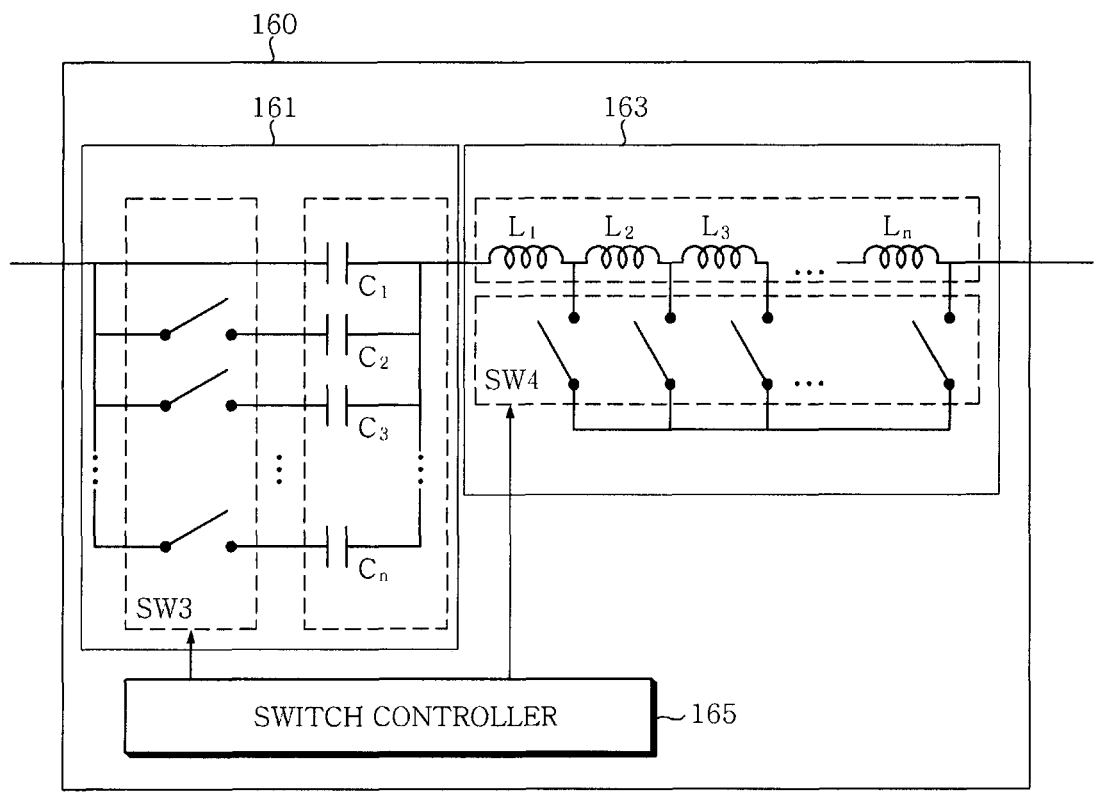
FIG. 3 is a detailed block diagram showing a configuration of a first resonance antenna shown in FIG. 1.

FIG. 3 is a detailed block diagram showing a configuration of the first resonance antenna shown in FIG. 1.

FIG. 3 shows that a variable capacitor circuit 161 and a variable inductor circuit 163 the first resonance antenna 160 are connected to each other in series, but is not limited thereto. Therefore, the variable capacitor circuit 161 and the variable inductor circuit 163 are connected to each other in parallel or various kinds of LC variable circuits having other configurations may be configured.

In the variable capacitor circuit 161, a plurality of capacitors C1, C2, C3, ..., Cn are connected to each other in parallel and each of the plurality of capacitors C1, C2, C3, ..., Cn is connected to a plurality of third switches SW3 in series.

In the variable inductor circuit 163, a plurality of inductors L1, L2, L3, ..., Ln are connected to each other in series and each of the plurality of capacitors L1, L2, L3, ..., Ln is connected to a plurality of fourth switches SW4 in parallel.

The switch controller 165 is connected to the third and fourth switches SW3 and SW4 and performs a control by turning-on or turning-off the plurality of third and fourth switches SW3 and SW4 so that the plurality of inductors and the plurality of capacitors are varied in order to search the inductance and the capacitance corresponding to the resonance frequency and the optimal impedance with the receiving side.

In this case, a negative imaginary component of the imaginary components of impedance may be controlled by varying the capacitance due to the variable capacitor circuit 161 and a positive imaginary component thereof may be controlled by varying the inductance due to the variable inductor circuit 163.

The transmitting controller 190 generally controls the wireless power transmitter 100.

More specifically, the transmitting controller 190 performs a control to set an initial resonance frequency, use the set initial resonance frequency to generate and amplify the wireless power signal to be transmitted through the first resonance antenna 160, convert the amplified wireless power signal into magnetic energy forming the closed loop due to the LC resonance of the inductor L and the capacitor C of the first resonance antenna 160, and receive and detect the reflection wireless power signal through the first resonance antenna 160 from the magnetic coupling energy through the magnetic coupling with the wireless power receiver 200 connected to the load apparatus 300.

In this case, the transmitting controller 190 receives the output power $P_{out}=P_{detect}$ of the wireless power signal and the reflection power $P_{reflect}$ of the reflection wireless power signal detected from the output power detector 170 and the reflection power detector 180 to determine whether or not the load apparatus 300 connected to the wireless power receiver 200 is presented according to the change ratio of the reflection power to the output power $P_{out}=P_{detect}$.

If it is determined that the load apparatus 300 is presented, the transmitting controller 190 performs a control to amplify the power of the wireless power signal generated from the frequency oscillator 110 to have the power strength corresponding to the strength of the wireless transmission power to be transmitted to the load apparatus 300 and to transmit the wireless power signal in a state where power is amplified to the receiver 200 through the first resonance antenna 160.

In this case, the transmitting controller 190 controls the impedance matching device 140 and the first resonance antenna 160 to generate the maximum power transmission, thereby performing the resonance frequency control and the impedance matching.

In other words, the transmitting controller 190 searches minimum turning points of the reflection wireless power signal received in the reflection power detector 180 while varying the real components of impedance of the impedance matching device 140 to set the real components of the impedance corresponding to the searched minimum turning points as the real components of the optimal impedance of the impedance matching device.

In addition, the transmitting controller 190 searches the minimum turning points of each of the reflection wireless power signal received in the reflection power detector 180 while changing the frequency and the imaginary component of impedance of the first resonance antenna 160, respectively, to set the imaginary components of the frequency and the impedance corresponding to each of the searched minimum turning points as the imaginary component of the resonance frequency and the optimal impedance of the first resonance antenna 160.

Hereinafter, the transmitting controller 190 determines the load apparatus 300 connected to the wireless power receiver 200 and if it is determined that the load apparatus 300 is presented, the process of setting the resonance frequency and the optimal impedance in order to transmit the wireless power in the optimal state will be described in detail.

Figure 4:
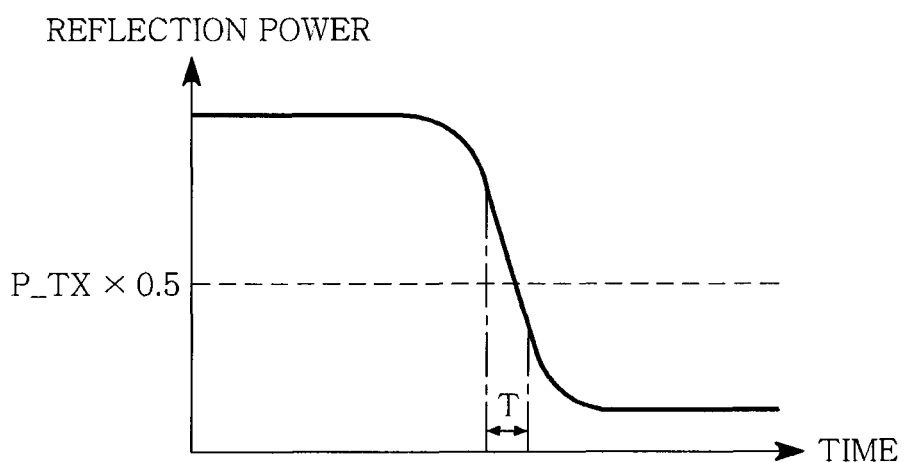
FIG. 4 is a diagram showing a reflection power curve over time when a load apparatus connected to a wireless power receiver is presented in an preferred embodiment of the present invention.
Figure 5:
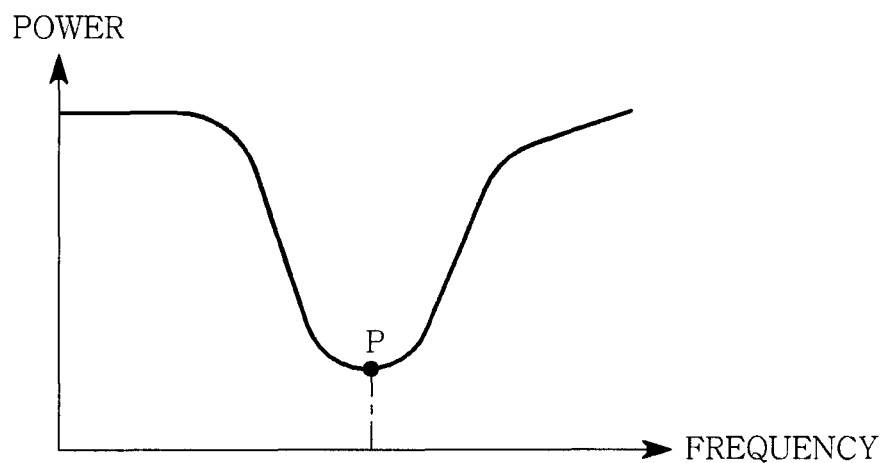
FIG. 5 is a diagram showing a reflection power curve according to a frequency time when a load apparatus connected to a wireless power receiver is presented in an preferred embodiment of the present invention.
Figure 6:
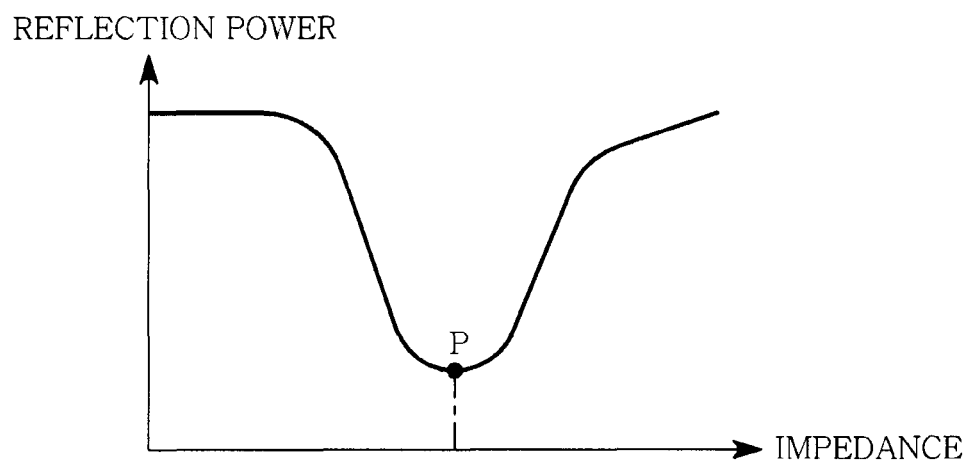
FIG. 6 is a diagram showing a reflection power curve according to impedance when a load apparatus connected to a wireless power receiver is presented in an preferred embodiment of the present invention.

FIG. 4 is a diagram showing a reflection power curve over time when a load apparatus connected to a wireless power receiver is presented in an preferred embodiment of the present invention, FIG. 5 is a diagram showing a reflection power curve according to a frequency time when a load apparatus connected to a wireless power receiver is presented in an preferred embodiment of the present invention, and FIG. 6 is a diagram showing a reflection power curve according to impedance when a load apparatus connected to a wireless power receiver is presented in an preferred embodiment of the present invention.

Referring to FIG. 4, a section T, in which the reflection power is constantly maintained and is then reduced remarkably as time passes, is generated.

The transmitting controller 190 may determine that the load apparatus 300 is connected to the wireless power receiver 200 or the power supply of the load apparatus 300 connected to the wireless power receiver 200 is turned-on in the section T in which the reflection power is remarkable reduced.

The reference of the section T in which the reflection power is remarkably reduced is determined that the load apparatus 300 connected to the wireless power receiver 200 is not presented if the ratio of the reflection power $P_{reflect}$ to the output power $P_{out}=P_{detect}$ (hereinafter, referred to 'a ratio of output to reflection power') according to the predetermined setting value 1 of the wireless power transmitter 100 is equal to or larger than the setting value 1, for example.

For example, when the output power $P_{out}=P_{detect}=1$ and the setting value 1=0.8, if the ratio of output to reflection power ≥0.8, it is determined that the load apparatus 300 connected to the wireless power receiver 200 is not presented, by being considered as the reflection loss within the error range lost in the air rather than the power loss due to the load apparatus 300 connected to the wireless power receiver 200.

To the contrary, if the reflection power ratio <0.8, it is determined that the load apparatus 300 connected to the wireless power receiver 200 is presented by being considered as the power loss due to the load apparatus 300 connected to the wireless power receiver 200.

As described above, if it is determined that the load apparatus 300 connected to the wireless power receiver 200 is presented, the resonance frequency setting and the impedance matching are performed as follows in order to transmit the wireless power in the optimal state.

First, the transmitting controller 190 performs a control to detect the reflection power $P_{reflect}$ from the reflection wireless power signal according to the frequency control (frequency tuning) through the variable inductance and capacitance of the first resonance antenna 160.

Through the process, it is possible to obtain the reflection power curve according to the frequency as shown in FIG. 5.

As shown in FIG. 5, it can be appreciated that the minimum turning points P are presented in the reflection power curve and the reflection power $P_{reflect}$ is minimized in the frequency corresponding to the minimum turning points P.

This implies that the resonance is generated in the frequency corresponding to the minimum turning point P. Therefore, the frequency corresponding to the minimum turning point P becomes the resonance frequency.

As such, the transmitting controller 190 controls the frequency by varying the inductance and capacitance of the first resonance antenna 160 in order to set the resonance frequency.

Meanwhile, the transmitting controller 190 also performs a control to detect the reflection power $P_{reflect}$ from the reflection wireless power signal according to the impedance control (impedance tuning) by varying the impedance of the impedance matching device 140 and the first resonance antenna 160.

Through the process, it is possible to obtain the reflection power curve according to the impedance as shown in FIG. 6.

As shown in FIG. 6, it can be appreciated that the minimum turning points P are presented in the reflection power curve and the reflection power $P_{reflect}$ is minimized in the impedance corresponding to the minimum turning points P.

This implies that the LC resonance is generated in the impedance corresponding to the minimum turning point P. Therefore, the impedance corresponding to the minimum turning point P becomes the matched optimal impedance.

The transmitting controller 190 controls the real component of the optimal impedance through the impedance matching device 140 in order to set the optimal impedance and controls the imaginary components of the optimal impedance through the first resonance antenna 160.

In this case, the search and setting of the real components and the imaginary components of the optimal impedance are performed to be the same as the process described in FIG. 6.

FIGS. 7 to 10 show the change in impedance and the change in transmission power according to whether the impedance matching device 140 according to the preferred embodiment of the present invention is used.

Figure 7:
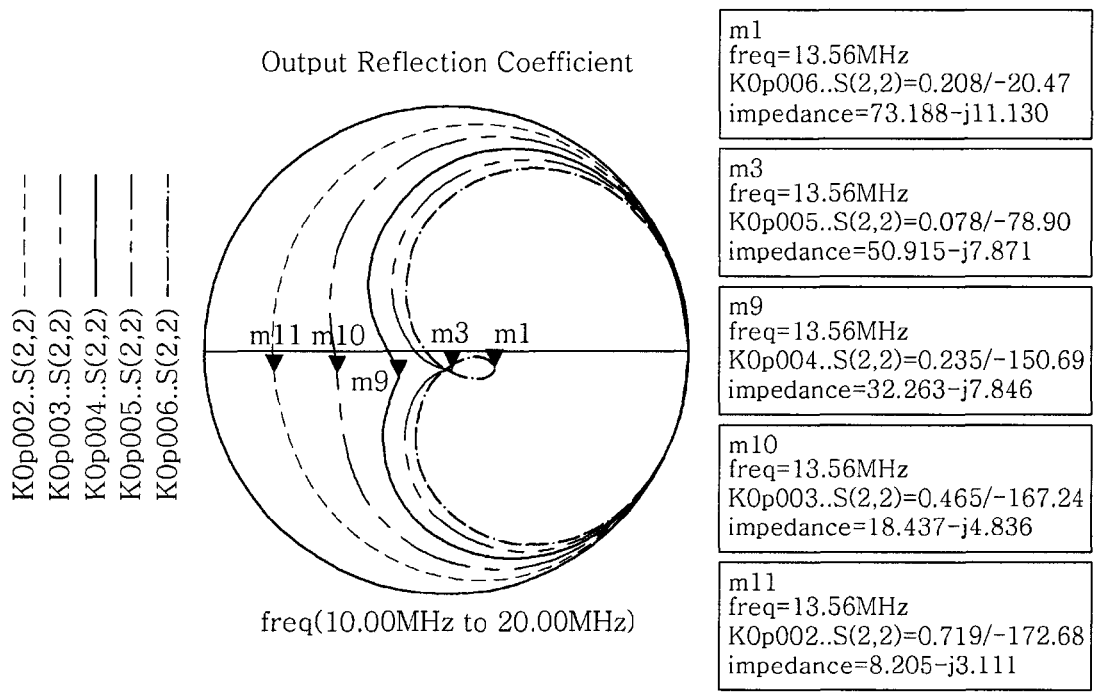
FIG. 7 is simulation results showing the change in impedance according to a distance between the wireless power transceivers according to the prior art that does not perform the impedance tuning.
Figure 8:
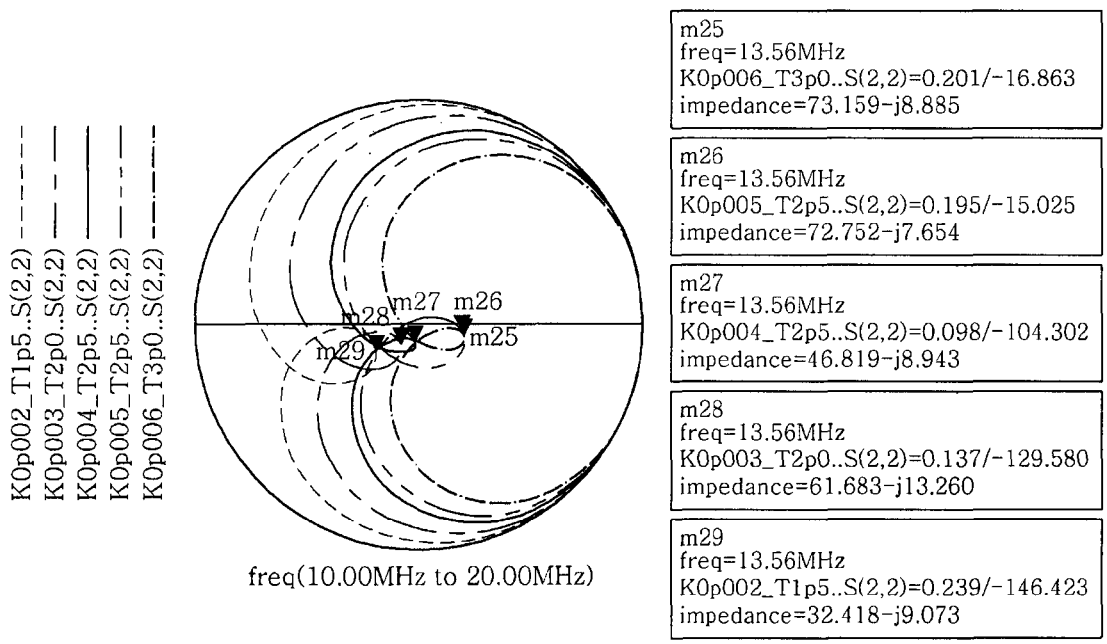
FIG. 8 is simulation results showing the change in impedance according to the distance between the wireless power transceivers performing impedance tuning by using the impedance matching device according to the preferred embodiment of the present invention.

FIG. 7 is simulation results showing the change in impedance according to a distance between the wireless power transceivers according to the prior art that does not perform the impedance tuning and FIG. 8 is simulation results showing the change in impedance according to the distance between the wireless power transceivers performing impedance tuning by using the impedance matching device according to the preferred embodiment of the present invention.

Figure 9:
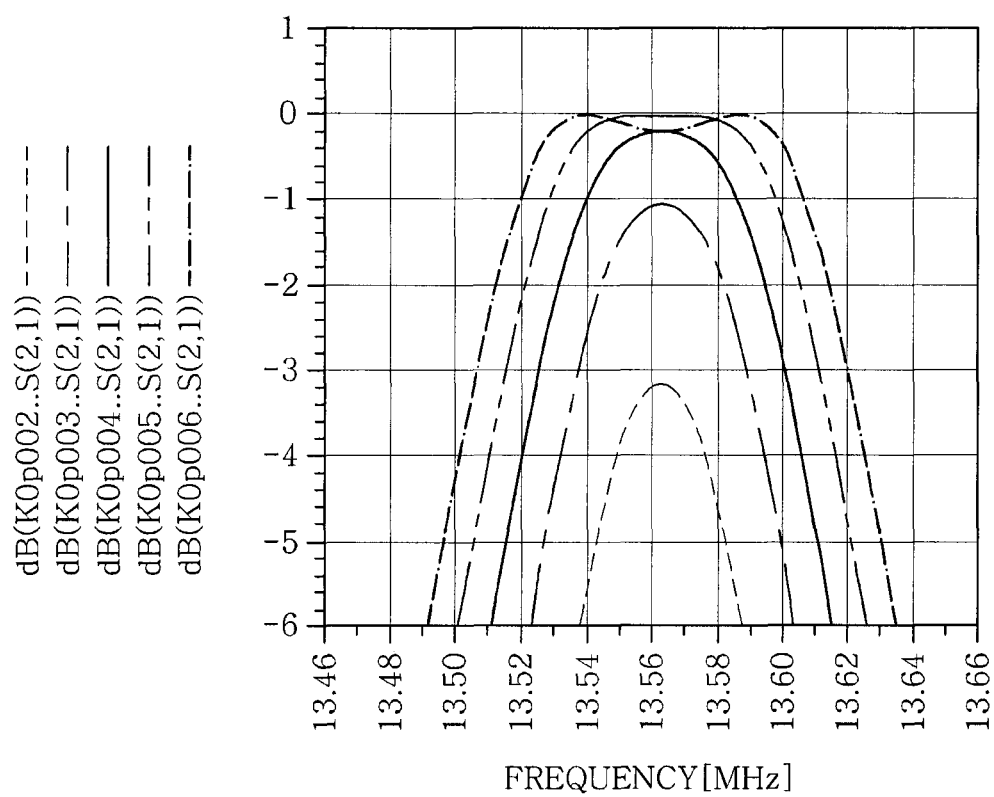
FIG. 9 is simulation results showing the power transmission according to a distance between the wireless power transceivers according to the prior art that does not perform the impedance tuning.
Figure 10:
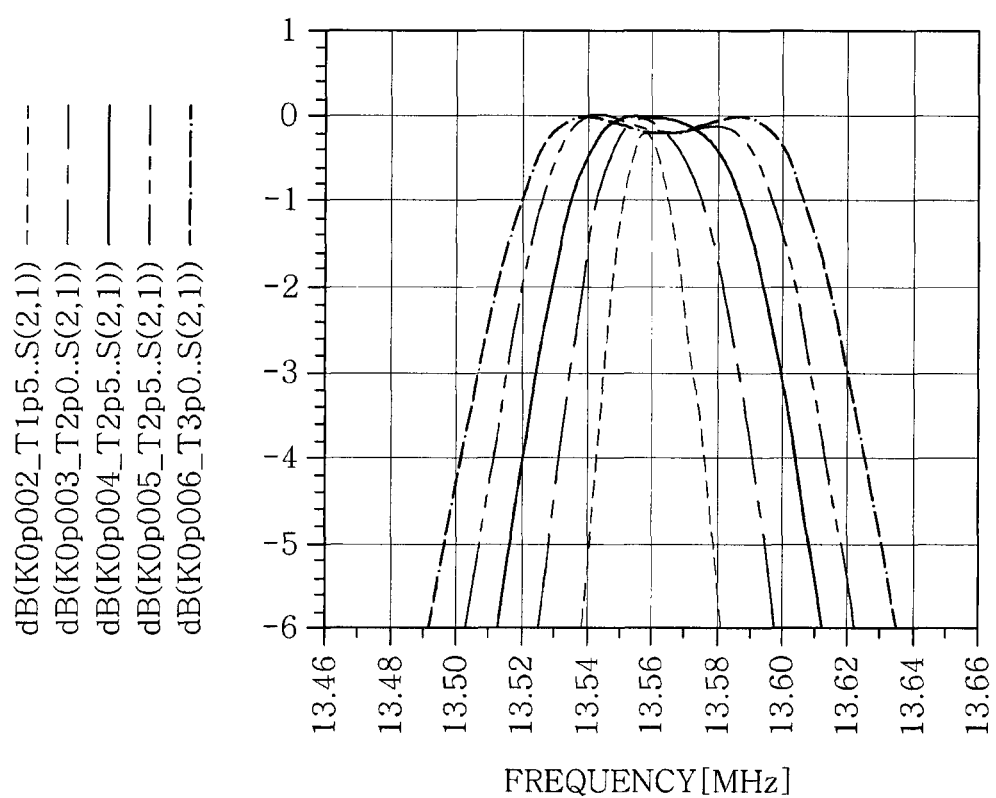
FIG. 10 is simulation results showing the power transmission according to the distance between the wireless power transceivers performing impedance tuning by using the impedance matching device according to the preferred embodiment of the present invention.

In addition, FIG. 9 is simulation results showing the power transmission according to a distance between the wireless power transceivers according to the prior art that does not perform the impedance tuning and FIG. 10 is simulation results showing the power transmission according to the distance between the wireless power transceivers performing impedance tuning by using the impedance matching device according to the preferred embodiment of the present invention.

Referring to FIGS. 7 and 8, the change in impedance according to a distance between the wireless power transceivers 100 and 200 may be compared by the wireless power transmission using a frequency of about 13.56 MHz.

As shown in FIG. 7, when the impedance tuning is not performed, as the distance between the wireless power transceivers 100 and 200 is increased, it can be appreciated that it is far away from the m3 when referring to m3 approximating 50[Ω].

As the distance between the wireless power transceivers 100 and 200 is increased, the coupling coefficient is small, such that a direction in which the impedance is small is changed based on 50[Ω].

However, when the impedance tuning is performed using the impedance matching device 140 according to the preferred embodiment of the present invention, it can be appreciated that m27 approximating 50[Ω] is concentrated as compared to FIG. 7.

The improved impedance matching is made by controlling the real components of the impedance by varying the winding ratio of the variable transformer of the impedance matching device 140.

As described above, the real components of the impedance may be matched by performing a control to approximate 50[Ω] using the impedance matching device 140 according to the preferred embodiment of the present invention.

In the same manner, the fine and accurate impedance matching may be performed finely and accurately by controlling the imaginary components of impedance using the first resonance antenna 160 according to the preferred embodiment of the present invention.

Referring to FIGS. 9 and 10, when the real part of impedance is controlled by controlling the winding ratio of the variable transformer of the impedance matching device 140, the change in transmission power may be compared.

As shown in FIG. 9, when the impedance tuning is not performed, it can be appreciated that the magnitude in transmission power is different according to the frequency.

In the wireless power transmission using the magnetic resonance manner, when the resonance frequency of the wireless power transmitter 100 is set to be the same as that of the wireless power receiver 200, the reflected power may be minimized and the transmitted power may be maximized. As the distance between the wireless power transmitter 100 and the wireless power receiver 200 approximate to each other or is away from each other, it implies that the power transmission does not occur efficiently by generating the detuning of the resonance frequency between wireless power transceivers 100 and 200.

However, when the impedance tuning is performed using the impedance matching device 140 according to the preferred embodiment of the present invention, the magnitude in power transmission is approximately the same as shown in FIG. 10.

In this case, the process of detuning the resonance frequency between the wireless power transmitter 100 and the wireless power receiver 200 may be performed again through the frequency tuning as shown in FIG. 5, together with the impedance tuning, by using the first resonance antenna 160 according to the preferred embodiment of the present invention.

Hereinafter, the components and operating method of the wireless power receiver 200 according to the preferred embodiment of the present invention will be described.

Referring again to FIG. 1, the second resonance antenna 210 is configured by the inductor (or variable inductor) and the variable capacitor (or variable capacitor) and is converted into the magnetic energy forming the closed loop by the LC resonance due to the inductance and the capacitance (or, through the variable inductance and capacitance), which is magnetically coupled with the magnetic energy formed from the wireless power transmitter 100.

The formed magnetic coupling energy also forms the closed loop, such that the wireless power signal converted from the magnetic coupling energy is received by the magnetic resonance manner.

Then, the second resonance antenna 210 supplies the wireless power signal received from the wireless power transmitter 100 to the load apparatus 300 connected to the wireless power receiver 200 and reflects the remaining wireless power signal to the wireless power transmitter 100.

The second resonance antenna 210 has the same configuration as the above-mentioned first resonance antenna 160 as shown in FIG. 3 and the detailed description thereof is replaced with the above-mentioned one.

The switch 220 is positioned between the second resonance antenna 210 and the rectifier 230 and is switched so that the second resonance antenna 210 performs or interrupts the magnetic coupling with the wireless power transmitter 100.

In other words, the switch 220 determines the receiving standby state or the receiving end state of the wireless power receiver 200.

When the switch 220 is turned-on, the wireless power receiver 200 receives the wireless power signal and when the switch 220 is turned-off, the wireless power receiver 200 stops receiving the wireless power signal.

For example, the switch 220 ends the magnetic coupling with the wireless power transmitter 100 when the load apparatus 300 connected to the wireless power receiver 200 does not require power any more (for example, when the charging of the battery is completed or the electronic devices/home appliances such as TV or computer, etc., are turned-off), while when the load apparatus 300 connected to the wireless power receiver 200 requires power (for example, when the charging of the battery starts or the electronic devices/home appliances such as TV or computer, etc., are turned-on), is switched to start the magnetic coupling with the wireless power transmitter 100.

The rectifier 230 rectifies the wireless power signal received from the second resonance antenna 210.

The power signal converter 240 is connected to the load apparatus 300 and converts the wireless power signal rectified from the rectifier 230 into the type of the proper DC signal or the AC signal in order to charge power in the power supply unit (not shown) of the load apparatus 300 or supply household power.

For example, in the case of the manner of storing a predetermined capacity by charging the power supply unit of the load apparatus 300 connected to the power signal converter 240 for a predetermined time like a battery charger, the power signal converter 240 converts the received wireless power signal into the appropriate DC signal in order to charge power in the power supply unit of the load apparatus 300.

In this case, the wireless power receiver 200 connected to the load apparatus 300 may further include the battery capacity detector (not shown) capable of detecting the capacity of the battery charger and transmits the signal detected from the battery capacity detector (not shown) to the receiving controller 260 of the wireless power receiver 200.

In addition, in the case of the manner of continuously supplying power by the power supply unit of the load apparatus 300 like electronic devices/home appliances, the power signal converter 240 converts the received wireless power signal into the proper AC signal in order to supply the household power to the power supply unit of the load apparatus 300.

Therefore, the power signal converter 240 may include an AC-AC converter (not shown) for converting the received wireless power signal into the proper AC signal type and an AC-DC converter (not shown) for converting the received wireless power signal into the proper DC signal type, or the like.

The charging circuit 250 is a circuit charging power converted from the power signal converter 240. As shown in FIG. 1, the charging circuit 250 may be included in the wireless power receiver 200 but is not limited thereto and therefore, may be included in the load apparatus 300.

The receiving controller 260 generally controls the wireless power receiver 200.

In detail, the receiving controller 260 receives the wireless power signal in the second resonance antenna 210 by the magnetic resonance manner to perform a control to supply power to the load apparatus 300 and to perform a control to reflect the remaining wireless power signal to the wireless power transmitter 100.

In addition, the receiving controller 260 performs a control to switch the turning-on/off of the switch 220 based on the battery capacity transmitted from the battery capacity detector or to switch the turning-on/off of the switch 220 according to whether the load apparatus 300 is connected.

Figure 11:
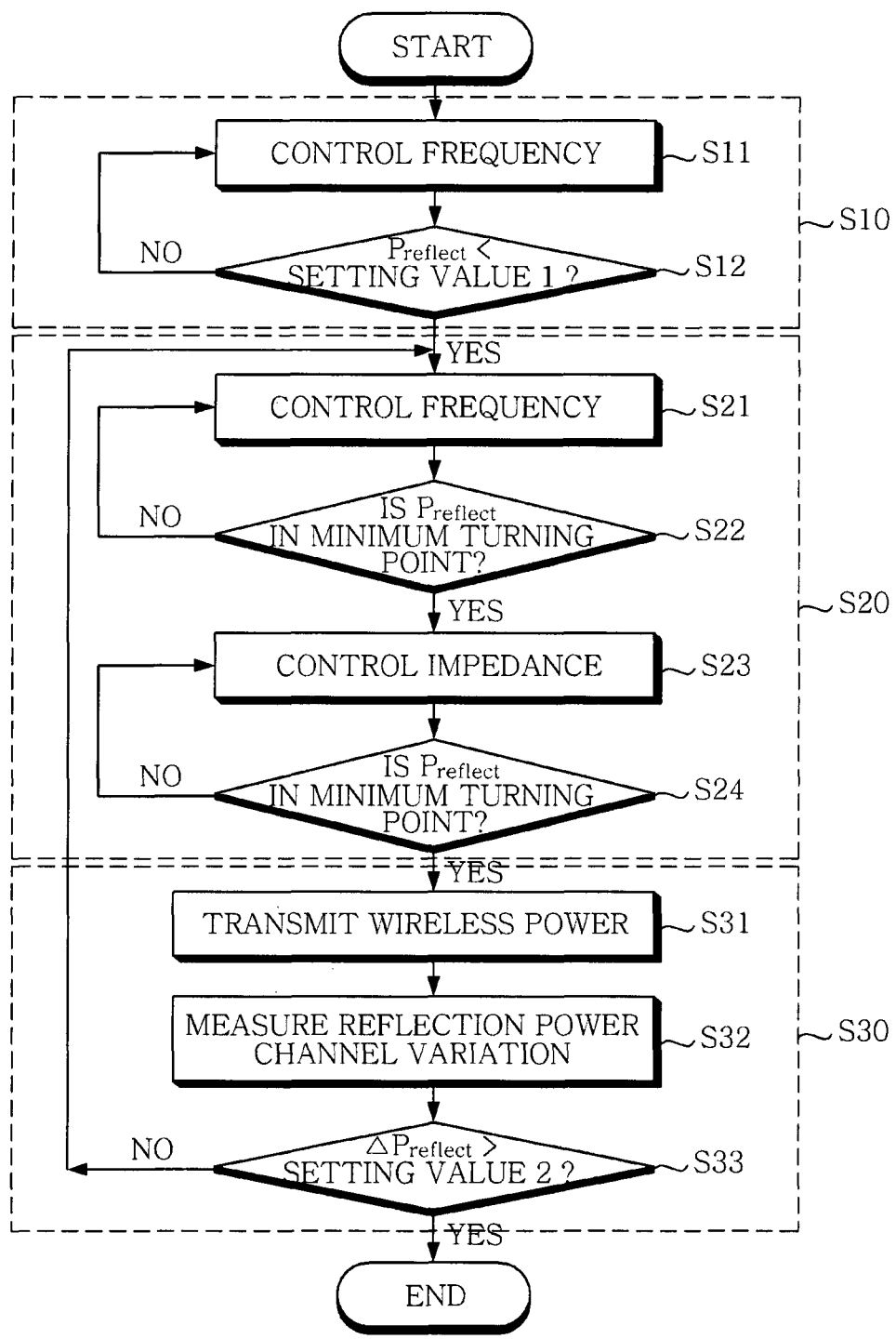
FIG. 11 is a flow chart explaining an operation of the wireless power transmitter according to the preferred embodiment of the present invention.

FIG. 11 is a flow chart explaining an operation of the wireless power transmitter according to the preferred embodiment of the present invention.

Describing the operation of the wireless power transmitter 100 with reference to FIG. 11, the transmitting controller 190 of the wireless power transmitter 100 largely performs a determining mode whether the load apparatus is presented (S10), a calibration mode (S20), and a wireless power transmitting mode (S30).

In the determining mode whether the load apparatus is presented (S10), when the wireless power transmitter 100 is first turned-on, the initial resonance frequency is set (S11).

Then, it is determined that the reflection power $P_{reflect}$ is smaller than the setting value 1 by detecting the reflection power $P_{reflect}$ of the reflection wireless power signal reflected from the receiver 200 from the wireless power signal transmitted at the set initial resonance frequency through the first resonance antenna 160 of the wireless power transmitter 100 (S12).

If the reflection power $P_{reflect}$ is smaller than the setting value 1, it is determined that the power loss occurs (that is, determines that the load apparatus is presented) and when the setting value is equal to or larger than 1, it is determined that the power loss is not presented (that is, determines that the load apparatus is not presented).

If it is determined whether or not the load apparatus 300 connected to the wireless power receiver 200 is presented, then the calibration mode for forming the optimal wireless power transmission state is performed through the frequency control and the impedance control.

In the calibration mode (S20), in order to search the resonance frequency for the optimal wireless power transmission between the wireless power transmitter 100 and the wireless power receiver 200, the reflection power $P_{reflect}$ of the reflection wireless power signal according to the frequency change is detected while controlling the frequency (frequency tuning) by varying the inductance and capacitance of the first resonance antenna 160 (S21).

Then, the frequency corresponding to the minimum turning points is determined as the resonance frequency by determining that the minimum turning points are presented in the reflection power $P_{reflect}$ (S22).

The impedance matching for the optimal wireless power transmission between the wireless power transmitter 100 and the wireless power receiver 200 is performed (S23).

Like the frequency control, the impedance matching detects the reflection power $P_{reflect}$ according to the impedance change while controlling the impedance (tuning impedance) by varying the impedance.

Then, the minimum turning points are set as the optimal impedance by determining whether the reflection power $P_{reflect}$ is presented in the minimum turning points (S24).

In this case, in order to determine the optimal impedance, at step (S23), the winding ration of the variable transformer is controlled and the real part of the impedance is controlled in the impedance matching device 140 of the wireless power transmitter 100 in order to more accurately and finely provide the impedance matching when the impedance is controlled by varying the impedance and the imaginary component of the impedance is controlled by varying the inductance and capacitance in the first resonance antenna 160 of the wireless power transmitter 100.

As described above, the wireless power can be transmitted in the optimal transmission state through the frequency calibration and the impedance calibration in order to provide the wireless power in the optimal state.

In the wireless power transmitting mode (S30), the wireless power is transmitted (S31) in the optimal transmission state through the calibration mode (S20).

Thereafter, the variation ($\Box P_{reflect}$) of the reflection power of the initial reflection wireless power signal and the current reflection wireless power signal are measured (S32) and it is determined whether the variation ($\Box P_{reflect}$) of the reflection power is larger than the setting value 2 (S33).

If the variation ($\Box P_{reflect}$) of the reflection power is smaller than the setting value 2, it is determined that the load apparatus 300 connected to the wireless power receiver 200 is charged or the supply of power is being continuously maintained and the wireless power is continuously transmitted in the optimal transmission state by controlling the frequency and the impedance through the calibration mode (S20) again.

If the variation ($\Box P_{reflect}$) of the reflection power is larger than the setting value 2, it is determined that the charging is completed in the load apparatus 300 connected to the wireless power receiver 200 or the load apparatus 300 is turned-off to stop the supply of power, thereby stopping the wireless power transmission.

Figure 12:
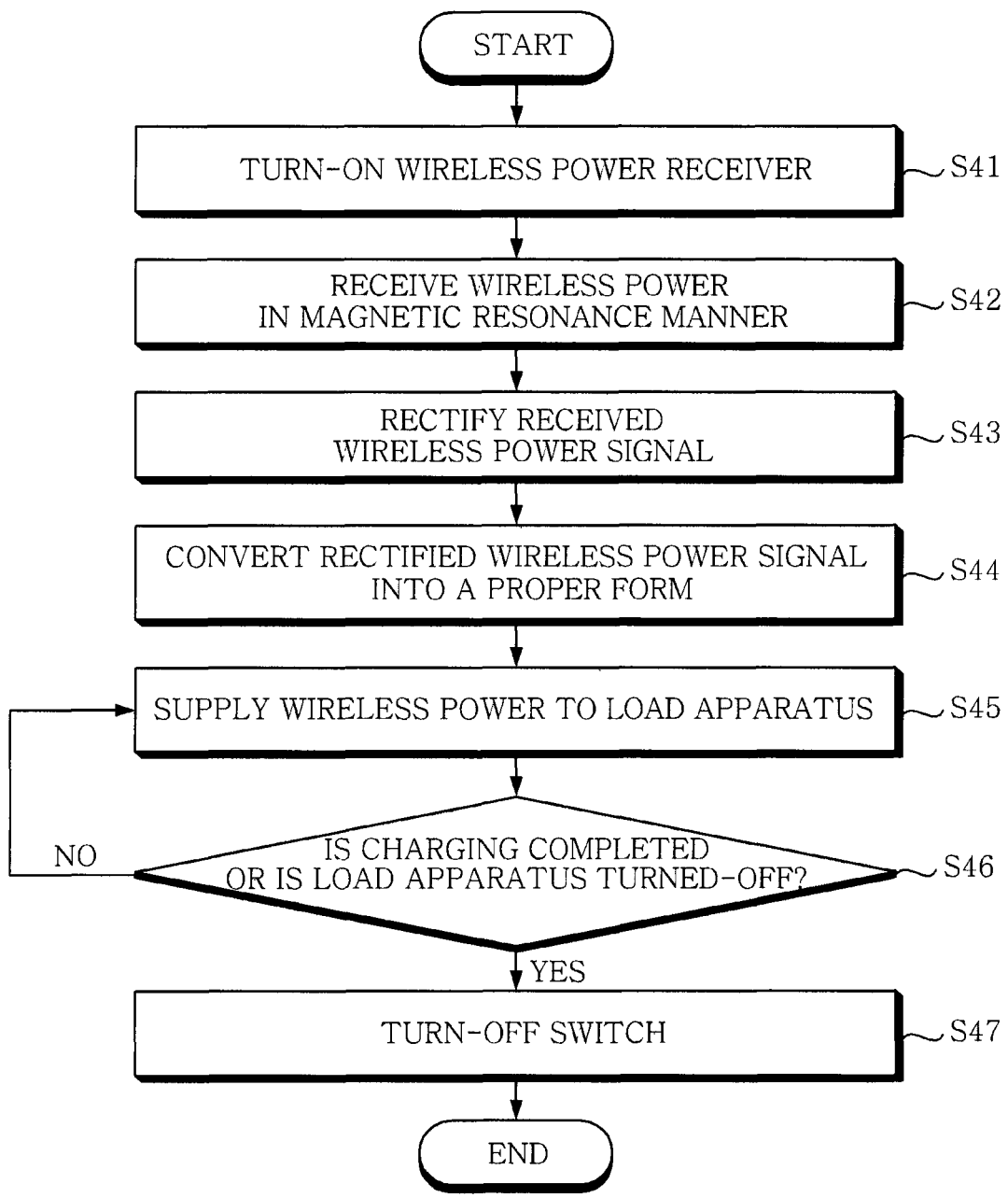
FIG. 12 is a flow chart explaining an operation of the wireless power receiver according to the preferred embodiment of the present invention.

FIG. 12 is a flow chart explaining the operation of the wireless power receiver according to the preferred embodiment of the present invention.

Describing the operation of the wireless power receiver 200 with reference to FIG. 12, if the wireless power receiver 200 is turned-on (S41), the wireless power signal transmitted from the transmitting side through the second resonance antenna 210 is received by the magnetic resonance manner (S42).

Thereafter, after the received wireless power signal is rectified through the rectifier (S43), the wireless power signal type is converted from AC to AC or from AC to DC through the power signal converter 240 so that power is properly supplied according to the load apparatus 300 connected to the wireless power receiver 200 (S44), thereby supplying the converted wireless power to the load apparatus 300 (S45).

Thereafter, it is determined that the charging is completed in the load apparatus 300 or the load apparatus is turned-off to stop the supply of power (S46), such that the switch is turned-off to continuously supply the wireless power received from the wireless power receiver 200 or stop the receiving of the wireless power (S47).

According to the present invention, the transmitting apparatus can recognize the receiving environment without the separate communication device or the system, thereby making it possible to reduce the costs of the wireless power transmission and reception apparatuses and simplifying the configuration and control of the apparatuses.

In addition, the present invention performs the calibration through the frequency control and the more accurate and fine impedance matching, thereby making it possible to configure the optimal wireless power transmitting and receiving environment under the resonance characteristics of very narrow band between the transmitting side and the receiving side.

Although the embodiments of the present invention regarding the touch panel have been disclosed for illustrative purposes, those skilled in the art will appreciate that a variety of different modifications, additions and substitutions are possible, without departing from the scope and spirit of the invention as disclosed in the accompanying claims. Accordingly, such modifications, additions and substitutions should also be understood as falling within the scope of the present invention.

What is claimed is:

1. A wireless power transmission apparatus, comprising:
a wireless power transmitter configured to receive an input power, generate a wireless power signal, wirelessly transmit the generated wireless power signal, receive a reflection wireless power signal to determine whether or not a loading is present, and, in response to a determination that loading is present, wirelessly transmit a reconfigured wireless power signal by using a substantially optimal impedance and a resonance frequency corresponding to the loading to supply power thereto for supplying and reflection of a remaining wireless power signal, that is not consumed, to the wireless power transmitter,
wherein the wireless power transmitter is configured to calculate a ratio of the transmitted wireless power signal to the reflection wireless power signal and determine presence of the loading according to the calculated ratio of the transmitted wireless power signal to the reflection wireless power signal, and
wherein the wireless power transmitter comprises
a frequency oscillator configured to receive the input power and generate the wireless power signal;
a power amplifier configured to output an amplified wireless power signal;
a transmitter configured to input and wirelessly transmit the wireless power signal or the amplified wireless power signal;
a transmitting controller configured to determine whether or not the loading is present; and
a power pass switch configured to connect the frequency oscillator to the transmitter in response to the transmitting controller determining whether or not the loading is present and connect the frequency oscillator to the power amplifier in response to the wireless power transmitter supplying power to the loading.

2. The wireless power transmission apparatus as set forth in claim 1, wherein the transmitter comprises:
a first resonance antenna including a variable capacitor circuit and a variable inductor circuit, the first resonance antenna configured to transmit the wireless power signal by using the substantially optimal impedance and the resonance frequency searched by varying the inductance and capacitance of the variable capacitor circuit and the variable inductor circuit, and receive and output the reflection wireless power signal;
an impedance matching device positioned between the power amplifier and the first resonance antenna to provide the impedance matching between the power amplifier and the first resonance antenna;
a directional power coupler positioned between the power amplifier and the impedance matching device or between the impedance matching device and the first resonance antenna and having directivity to output the wireless power signal input through a first port from the power amplifier or the impedance matching device to the first resonance antenna through a second port and to output the reflection wireless power signal input through the second port from the first resonance antenna through a third port;
an output power detector detecting and outputting the output power of the wireless power signal output from the second port of the directional power coupler; and
a reflection power detector configured to detect and output the reflection power of the reflection wireless power signal output from the third port of the directional power coupler;
wherein the transmitting controller is configured to calculate the ratio of the reflection power to the output power, determine whether or not a load apparatus is present according to the calculated output-reflection power ratio, and control the first resonance antenna so as to transmit the reconfigured wireless power signal by using the substantially optimal impedance and the resonance frequency corresponding to the load apparatus and the power pass switch.

3. The wireless power transmission apparatus as set forth in claim 2, wherein the impedance matching device comprises:
a transformer including a primary winding and a secondary winding; a plurality of first switches mounted at the primary winding;
a plurality of second switches mounted at the secondary winding; and
a first switch controller connected to the plurality of first and second switches and configured to control the plurality of first and second switches to vary the winding ratio of the primary winding to the secondary winding in order to control the real components of the impedance.

4. The wireless power transmission apparatus as set forth in claim 3, wherein the transmitting controller is further configured to search substantially minimum turning points of the reflection wireless power signal received in the reflection power detector while changing the real components of the impedance of the impedance matching device to set the real components of impedance corresponding to the searched minimum turning points as the real components of the substantially optimal impedance of the impedance matching device.

5. The wireless power transmission apparatus as set forth in claim 2, wherein the first resonance antenna comprises:
a variable capacitor circuit configured to vary capacitance by connecting a plurality of capacitors in parallel and connecting a plurality of third switches to each of the plurality of capacitors in series,
a variable inductor circuit configured to vary inductance by connecting a plurality of inductors in series and connecting a plurality of fourth switches to each of the plurality of inductors in parallel; and
a second switch controller connected to the plurality of third and fourth switches and configured to control the plurality of third and fourth switches to vary the capacitance and the inductance in order to search the imaginary components of the resonance frequency and the substantially optimal impedance,
the variable capacitor circuit and the variable inductor circuit being connected in series or in parallel.

6. The wireless power transmission apparatus as set forth in claim 5, wherein the transmitting controller is further configured to search a substantially minimum turning point of the reflection wireless power signal received in the reflection power detector while changing the imaginary components of the frequency and the impedance of the first resonance antenna, respectively, to set the imaginary components of the frequency and the impedance corresponding to each of the searched minimum turning points as the imaginary components of the resonance frequency and the substantially optimal impedance of the first resonance antenna.

7. The wireless power transmission apparatus as set forth in claim 3, further comprising a wireless power receiver comprising:
a second resonance antenna including the variable capacitor circuit and the variable inductor circuit configured to receive the wireless power signals transmitted from the wireless power transmitter by using the substantially optimal impedance and the resonance frequency searched by varying the inductance and the capacitance of the variable capacitor circuit and the inductor circuit and to reflect the remaining wireless power signal to the wireless power transmitter;
a rectifier configured to rectify the wireless power signal received by the second resonance antenna;
a power signal converter connected to the load apparatus and configured to convert the wireless power signal rectified by the rectifier into the power signal according to a power supplying manner and to supply the converted power signal to the load apparatus; and
a receiving controller configured to perform a control to receive the wireless power signal in the second resonance antenna and supply power to the load apparatus and to reflect the remaining wireless power signal to the wireless power transmitter.

8. The wireless power transmission apparatus as set forth in claim 7, wherein the second resonance antenna comprises:
a variable capacitor circuit configured to vary capacitance by connecting a plurality of capacitors in parallel and connecting a plurality of fifth switches to each of the plurality of capacitors in series,
a variable inductor circuit configured to vary inductance by connecting a plurality of inductors in series and connecting a plurality of sixth switches to each of the plurality of inductors in parallel; and
a third switch controller connected to the plurality of fifth and sixth switches and configured to control the plurality of fifth and sixth switches to vary the capacitance and the inductance in order to search the imaginary components of the resonance frequency and the substantially optimal impedance,
the variable capacitor circuit and the variable inductor circuit being connected in series or in parallel.

9. The wireless power transmission apparatus as set forth in claim 7, wherein the wireless power receiver further comprises a rectifier switch positioned between the second resonance antenna and the rectifier configured to interrupt the wireless power transmission received in the second resonance antenna, and
the receiving controller configured to control the rectifier switch in the case where the connection of the load apparatus is disconnected to interrupt the power transmission received in the second resonance antenna.

10. A wireless power transmitter, comprising:
a frequency oscillator configured to receive an input power and generate a wireless power signal to be transmitted;
a power amplifier configured to be disconnected from the frequency oscillator while determining whether or not a loading is present, and amplify and output the wireless power signal generated from the frequency oscillator while supplying power to the loading;
a first resonance antenna including a variable capacitor circuit and a variable inductor circuit, configured to transmit the wireless power signal by using a substantially optimal impedance and a resonance frequency set by varying the inductance and capacitance of the variable capacitor circuit and the variable inductor circuit, and to receive and output a reflected wireless power signal;
an impedance matching device positioned between the power amplifier and the first resonance antenna configured to provide the impedance matching between the power amplifier and the first resonance antenna;
a directional power coupler positioned between the power amplifier and the impedance matching device or between the impedance matching device and the first resonance antenna and configured to have directivity to output the wireless power signal input through a first port from the power amplifier or the impedance matching device to the first resonance antenna through a second port and output the reflection wireless power signal input through the second port from the first resonance antenna through a third port;
an output power detector configured to detect and output an output power of the wireless power signal output from the second port of the directional power coupler;
a reflection power detector configured to detect and output a reflection power of the reflection wireless power signal output from the third port of the directional power coupler;
a transmitting controller configured to calculate a ratio of the reflection power to the output power, determine whether or not the loading is present according to the calculated output-reflection power ratio, and in response thereto, control the first resonance antenna so as to transmit a reconfigured wireless power signal by using a substantially optimal impedance and resonance frequency corresponding to the loading; and
a power pass switch configured to connect the frequency oscillator to the power amplifier to supply power to the loading and connect the frequency oscillator to the impedance matching device or the directional power coupler to determine whether or not the loading is present.

11. The wireless power transmitter as set forth in claim 10, wherein the impedance matching device comprises:
a transformer including a primary winding and a secondary winding; a plurality of first switches mounted at the primary winding;
a plurality of second switches mounted at the secondary winding; and
a first switch controller connected to the plurality of first and second switches and configured to control the plurality of first and second switches to vary the winding ratio of the primary winding to the second winding in order to control the real components of the impedance.

12. The wireless power transmitter as set forth in claim 11, wherein the transmitting controller is configured to search substantially minimum turning points of the reflection wireless power signal received in the reflection power detector while changing the real components of the impedance of the impedance matching device, to set the real components of impedance corresponding to the searched minimum turning points as the real components of the substantially optimal impedance of the impedance matching device.

13. The wireless power transmitter as set forth in claim 10, wherein the first resonance antenna comprises:
a variable capacitor circuit configured to vary capacitance by connecting a plurality of capacitors in parallel and connect a plurality of third switches to each of the plurality of capacitors in series;

a variable inductor circuit configured to vary inductance by connecting a plurality of inductors in series and connecting a plurality of fourth switches to each of the plurality of inductors in parallel; and a second switch controller connected to the plurality of third and fourth switches and configured to control the plurality of third and fourth switches to vary the capacitance and the inductance in order to search the imaginary components of the resonance frequency and the substantially optimal impedance, the variable capacitor circuit and the variable inductor circuit being connected in series or in parallel.

14. The wireless power transmitter as set forth in claim 13, wherein the transmitting controller is configured to search each of substantially minimum turning points of the reflection wireless power signal received in the reflection power detector while changing the imaginary components of the frequency and the impedance of the first resonance antenna, respectively, to set the imaginary components of the frequency and the impedance corresponding to each of the searched minimum turning points as the imaginary components of the resonance frequency and the substantially optimal impedance of the first resonance antenna.

15. The wireless power transmitter as set forth in claim 10, wherein the directional power coupler is a circulator.

16. A wireless power transmission method, comprising:
by a frequency oscillator, receiving an input power and generating a wireless power signal;
   by a transmitting controller, controlling a power pass switch to connect the frequency oscillator to a transmitter;
   by the transmitter, wirelessly transmit the wireless power signal; by the transmitting controller,
   detecting a reflected wireless power signal;
   calculating a ratio of the transmitted wireless power signal to the reflected wireless power signal;
   determining a presence of a loading according to the calculated ratio of the transmitted wireless power signal to the reflected wireless power signal; and
   in response to a determination that a loading is connected:
   searching a resonance frequency and a substantially optimal impedance therefor;
   reconfiguring the wireless power signal according to the searched resonance frequency and the substantially optimal impedance;
   controlling the power pass switch to connect the frequency oscillator to a power amplifier to perform substantially maximum power transmission level; and
   transmitting the amplified reconfigured wireless power signal by using the searched resonance frequency and the substantially optimal impedance via the power amplifier and the transmitter.

17. The wireless power transmission method as set forth in claim 16, wherein the detecting the reflected wireless power signal further comprises:
   transmitting the wireless power signal to a wireless power receiver by the transmitter;
   receiving the transmitted wireless power signal by the wireless power receiver and reflecting the remaining wireless power signal; and
   receiving the reflected wireless power signal by the transmitter to detect a reflection power strength and then, confirming whether or not a load apparatus is connected to the wireless power receiver according to the reflection power strength.

18. The wireless power transmission method as set forth in claim 16, wherein the searching the resonance frequency and the substantially optimal impedance comprises:
   responsive to a determination that a load apparatus is connected to a wireless power receiver by the wireless power transmitter, searching substantially minimum turning points of the reflection wireless power signal while varying a frequency and searching the substantially minimum turning points of the reflection wireless power signal while varying impedance;
   setting a frequency and impedance corresponding to each of the minimum turning points searched by the transmitter as a resonance frequency and an substantially optimal impedance performing maximum power transmission; and
   transmitting the reconfigured wireless power signal in a state where the reconfigured wireless power signal is matched to the substantially optimal impedance in the resonance frequency.

19. A wireless power transmission and reception apparatus, comprising:
   a wireless power receiver; a power amplifier;
   a wireless power transmitter selectively decoupleable from the power amplifier, the transmitter configured to decouple with the power amplifier and generate a wireless power signal, wirelessly transmit the generated wireless power signal to a remote wireless power receiver, receive a reflection wireless power signal,
   calculate a ratio of the transmitted wireless power signal to the reflection wireless power signal,
   determine presence of a loading according to the calculated ratio, and,
   in response to a determination that the loading is present, couple with the power amplifier and wirelessly transmit a reconfigured and amplified wireless power signal by using a substantially optimal impedance and a resonance frequency corresponding to the loading to supply power to the remote wireless power receiver,
   wherein the wireless power transmitter comprises
   a frequency oscillator configured to receive input power and generate the generated wireless power signal;
   a power amplifier configured to output an amplified wireless power signal;
   a transmitter configured to receive and wirelessly transmit the wireless power signal or the amplified wireless power signal;
   a transmitting controller configured to determine whether or not the loading is present; and
   a power pass switch configured to connect the frequency oscillator to the transmitter in response to the transmitting controller determining whether or not the loading is present, and connect the frequency oscillator to the power amplifier in response to the wireless power transmitter supplying power to the loading.

20. A non-transitory computer readable medium including instructions that, when executed by a processor, cause the processor to perform the method of claim 16.

* * * * *